Figure 1:
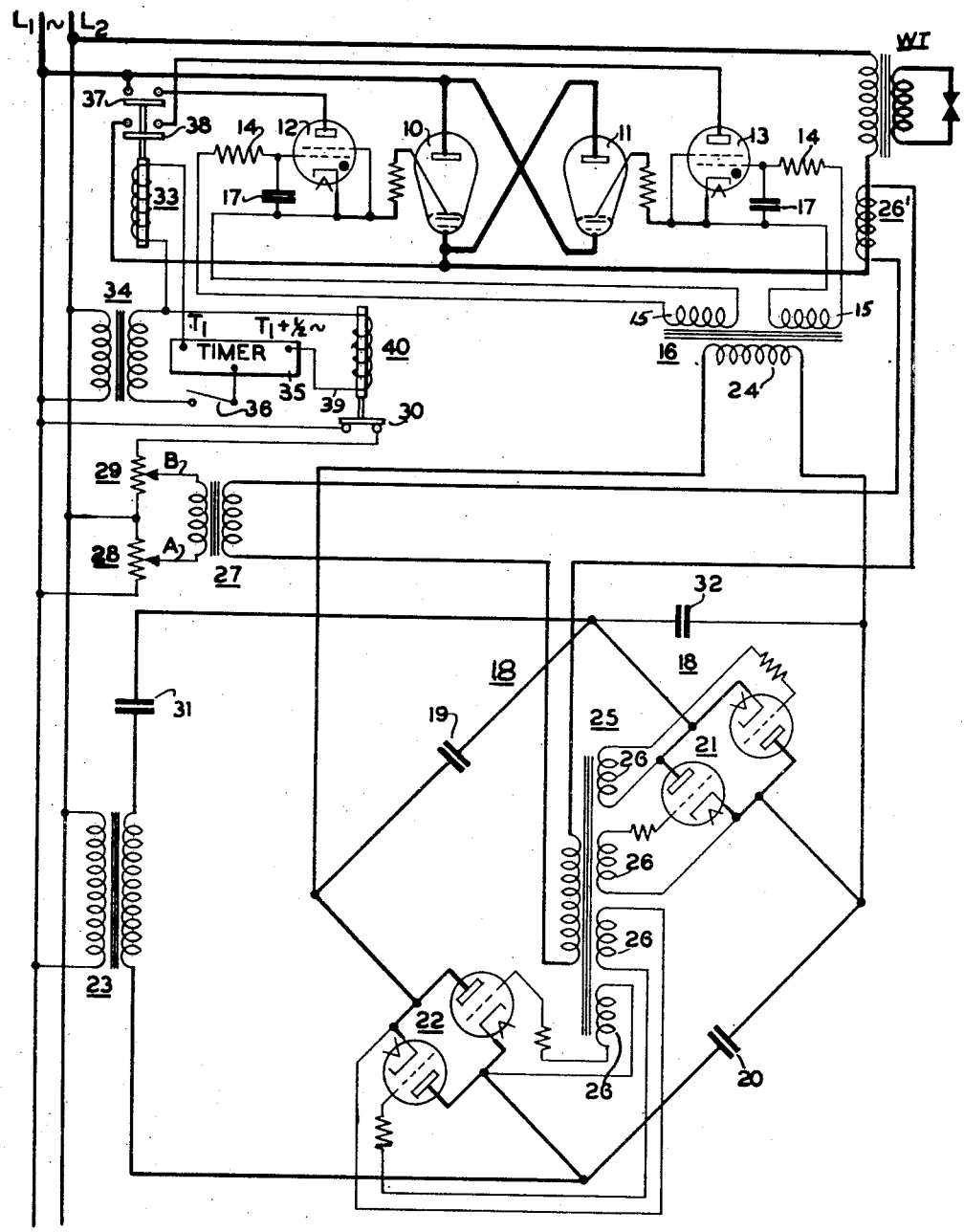

Inventors.
ROBERT L. RINGER JR.
CLYDE E. SMITH
By Francis J. Klempay
Attorney

Patented Jan. 11, 1949

2,458,644

UNITED STATES PATENT OFFICE

2,458,644

ELECTRONIC CONTROL SYSTEM UTILIZING AUTOMATIC PHASE SHIFT

Robert L. Ringer, Jr., and Clyde E. Smith, Warren, Ohio, assignors to The Taylor-Winfield Corporation, Warren, Ohio, a corporation of Ohio Application August 6, 1943, Serial No. 497,714

4 Claims. (Cl. 323—37)

This invention relates to electrical systems and more particularly to circuit control methods and apparatus wherein the desired control or regulation may be effected automatically in response to variations in a reference condition. Among the more specific objects of the invention are the provisions of the following:

Improved circuit arrangements wherein the quantity of electrical energy furnished a load circuit may be readily and automatically controlled in response to the current flowing in the circuit whereby the current may be kept constant or, if desired, readily varied according to a predetermined time pattern.

Improved circuit arrangements for controlling the energy furnished a load circuit in such manner that a predetermined constant or time patterned voltage is maintained across the circuit irrespective of variations in the load.

Improved circuit arrangements for automatically and instantaneously varying the conduction points, in relation to a source voltage wave, of electronic valves controlling the flow of energy from the source to the circuit whereby such flow may be expeditiously controlled in accordance with wide variations in the reference condition.

Improved controlled excitation circuits for electronic valves whereby incremental modulation within the maximum possible range of output of the valves may be automatically effected.

Improved methods and circuits for controlling the operation of electronic discharge devices utilizing the phase shifting method of control wherein full automatic operation of such control may be effected.

Improved method and circuits for controlling the operation of electronic discharge devices utilizing the phase shifting method of control wherein full automatic operation of such control is effected in response to variations in a reference voltage.

An improved phase shifting network wherein the phase deviation may be made automatically responsive to variations in a reference condition.

An improved phase shifting network in which the phase angle deviation is a function of a reference voltage magnitude or polarity.

An improved welding system having a welding load circuit of variable impedance wherein the welding current may be readily maintained either constant or variable according to time, as desired.

While the inventions disclosed herein are of particular utility in electric welding systems and will be specifically described in relation thereto it should be understood that the broader principles of the inventions are of equal applicability to other specific uses.

In electric resistance welding it is recognized that a number of normally uncontrollable factors affect the quantity of energy furnished the weld even though an effort is made through the use of timers and circuit controlling devices such as phase controlled ignitrons, for example, to control the welding current and the total energy furnished the weld. Most important of these factors is the change in the total impedance of the load circuit resulting from changes in the position of the work in the throat of the welding machine. As the work is moved inwardly between the arms which carry current to the electrodes the impedance increases and if the current supply circuit is controlled only in the conventional manner outlined above progressively less current will flow and progressively weaker welds will result as such inward movement continues. The present invention provides in a practicable system, for the automatic compensation of such factors so that the welding current may be accurately and automatically regulated. This compensation, moreover, is operative over a wide range of impedance changes. Similarly, automatic voltage compensation or regulation may be effected.

In accordance with this invention the flow of electrical energy from the source to the load is controlled by an electronic valve or valves each having a control element which is operative to determine the particular point in the half cycle of the source voltage wave at which the valve begins to conduct. This valve is, preferably, of the mercury pool cathode type having a starting or ignition electrode and associated with the same there may be a grid controlled discharge device of the gaseous type to control energization of the ignition device. Since it is desired to regulate the current or voltage in the load circuit, a reference condition variable in accordance with either the current or voltage in the circuit is established by suitable means, as a current or voltage transformer for example, and variations in this condition are utilized to determine the ignition point of the electronic valve and gaseous device. Conveniently, the reference condition is in the form of potential differences and means is provided to control the ignition point of the discharge device and electronic valve in accordance with the instantaneous value of this reference difference in potential. This is accomplished by means of an improved phase shifting network operable in such manner that the phase angle shift is a function of the value of the reference voltage. In many instances, as in the above described current or voltage compensated welding systems for example, it is desirable that a wide range of control of conduction in the valve or valves be obtainable and, accordingly, the phase shifting network of the present invention is operative to effect, in incremental steps, a wide range of phase deviation. In a representative practical embodiment of the invention controlled phase shift up to nearly 180° may be obtained and a control of this nature, particularly since it can be made automatically responsive to variations in a readily producable reference condition, is highly advantageous in many applications as will be understood.

The above and other objects and advantages of the invention will become apparent upon consideration of the following detailed specification and the accompanying drawings wherein there is specifically disclosed certain representative and practical embodiments of the invention.

Figure 2:
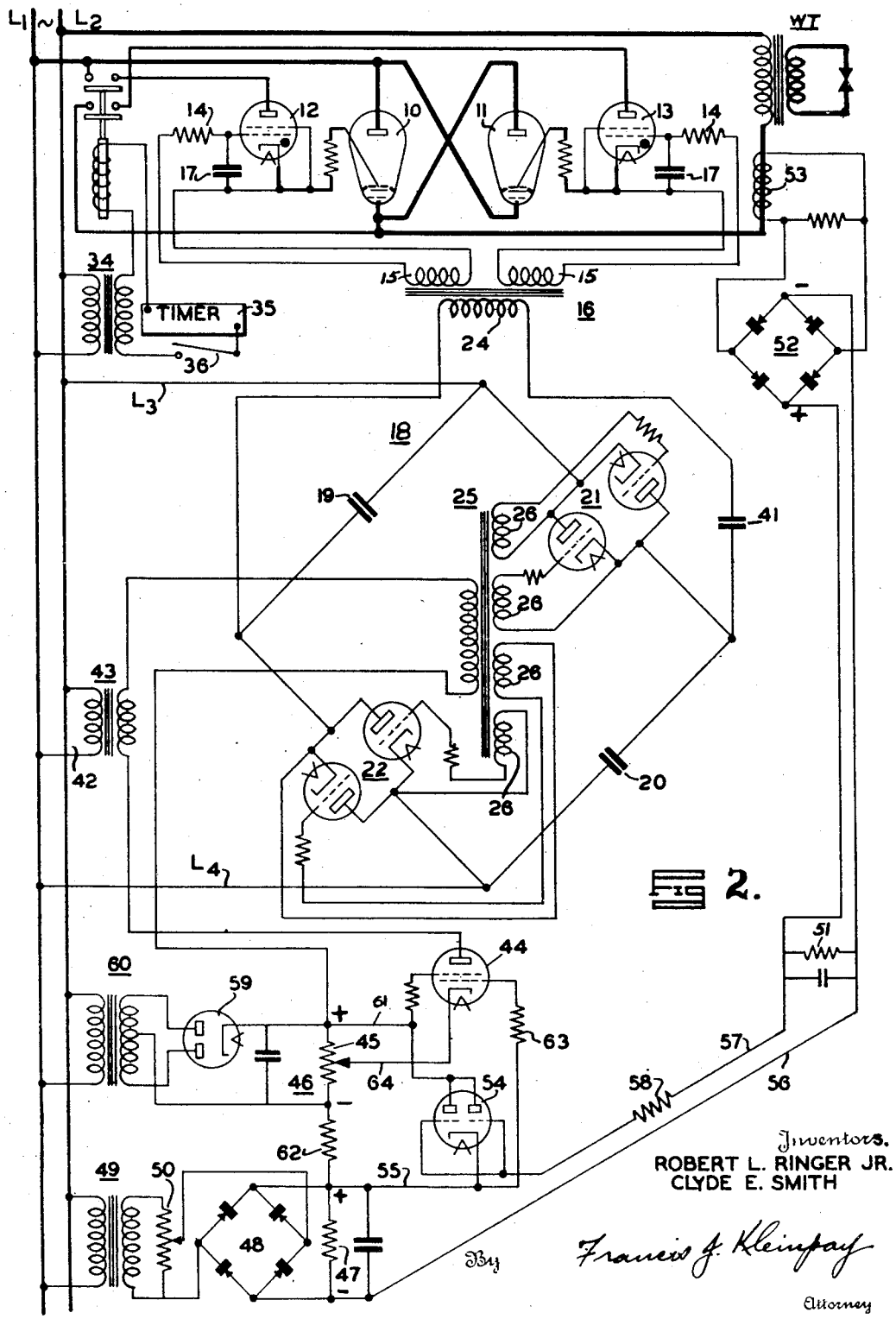

In the drawing:

Figure 1 is a schematic circuit diagram of a welding system employing an alternating source of current and constructed according to the principles of the invention; and Figure 2 is a modification of the system of Figure 1.

Basically, the systems of Figures 1 and 2 are generally similar and therefore identical reference numerals are used in the respective figures to designate corresponding parts. An alternating current source having conductors L1 and L2 is arranged to energize the primary winding of a welding transformer WT the secondary of which is, in accordance with usual practice, directly connected to suitable arms or horns, not shown, for supporting and conducting current to the welding electrodes. The flow of current to the welding transformer is controlled by a pair of electronic discharge devices 10 and 11 inserted in the conductor L1 and connected in inverse parallel for full wave operation of the welding system. Devices 10 and 11 are preferably each of the vapor discharge type having an anode, a mercury pool cathode and a control or ignition electrode having contact with or extending into the pool of mercury. Each of the valve 10 and 11 has an associated discharge device (12 and 13, respectively) for controlling the energization of its ignition electrode at a controlled point in the positive anode to cathode half cycle of the source.

Each of the control devices 12 and 13 are preferably of the gas filled type having an anode adapted to be connected with the anode of its associated valve 10 (11), a cathode connected through a suitable current limiting resistance to the ignition electrode of its associated valve and a control grid arranged to be controllably biased in the manner to be hereinafter described.

The control electrodes of the discharge devices 12 and 13 are coupled to their respective cathodes through the usual grid resistors 14 and through secondary windings 15 of a grid or biasing transformer 16. Filtering capacitances 17 are provided to absorb undesirable voltage transients which may appear in the grid control circuits.

Transformer 16 is arranged to be energized from an alternating current source in controlled phase relation to the voltage which appears across line L1—L2 and which is impressed on the discharge devices 10, 11 and 12, 13. There is provided, in accordance with the present invention, an improved phase shifting network for determining this relation and, preferably, this network is so arranged that its operation (effect) may be automatically controlled in response to changes appearing in a reference condition.

The phase shifting device of the invention, indicated in its entirety by the reference numeral 18, is of the double-reactance symmetrical bridge type having equal reactances, preferably capacitive, 19 and 20 and controllable balanced conductances 21 and 22 preferably each comprised of a pair of grid controlled vacuum discharge devices connected in inverse parallel. Alternating voltage in phase with the voltage in line L1—L2 is, in the embodiment of Figure 1, furnished the bridge circuit through a transformer 23 which has its primary connected to the conductors L1, L2 and one terminal of its secondary connected to the juncture of conductance 21 and reactance 19 while its other terminal is connected to the juncture of conductance 22 and reactance 20. As shown, the other two juncture points of the bridge are connected to the primary winding 24 of the grid transformer 16. It has been found that in the symmetrical bridge circuit of the kind illustrated and described the phase relationship between the output voltage supplied to primary 24 of transformer 16 and the input voltage supplied by the transformer 23 is a function of the magnitude and instantaneous polarity of the biasing voltages applied to the vacuum discharge devices of the respective translating devices (21 and 22). It can be shown that in a bridge circuit of the kind disclosed $$\theta = 180 - 2 \arctan X_c G$$

where $\theta$ represents the angle of phase shift, $X_c$ the value of the reactance and $G$ the conductance of the translating devices (21 and 22). Thus, as the tubes of these devices are rendered more conductive by decrease of grid biasing potential the output voltage wave applied to transformer 16 becomes closer in phase with input voltage wave furnished the bridge circuit. As the tubes approach cut-off the phase shift approaches 180°. A singular advantage of the circuit described is that while a phase shift through a wide angle may be effected in incremental steps the input and output voltages are always equal thus facilitating the utilization of the output for the control of the principal circuit controlling valves.

As indicated above, the operation of the above described phase shifting bridge circuit depends on the application of biasing voltages of properly adjusted magnitude and instantaneous polarity. These voltages are applied through grid transformer 25, the secondaries 26 of which are connected in the cathode-control grid circuits of the tubes of the translating devices 21 and 22. In the modification of Figure 1 the alternating potential furnished the transformer 25 is comprised of two opposing components, the strength of one being made dependent on the strength of current flowing in the welding load circuit by means of a current transformer 26' the secondary of which is connected in series with the primary winding of the transformer 25. The opposing component, a normally fixed reference voltage, is impressed through transformer 27 the secondary of which is in the series circuit including the secondary of transformer 26' of the primary of transformer 25. The potential applied to the primary winding of transformer 27 is in phase with the source L1—L2 but is made adjustable in value by the potentiometers 28 and 29 connected across the line L1—L2. Sliding contact A of potentiometer 28 is connected to one terminal of the primary of transformer 27 while the other terminal thereof is connected to the adjustable contact B of the potentiometer 29. As shown, a contactor 30 is in the circuit which connects the resistance element of potentiometer 29 across the line L1—L2 and, as will be explained below, this contactor is closed between welds and is arranged to open upon the expiration of one half cycle following the initiation of a welding cycle. When contact 30 is opened the potential applied to transformer 27 is at some lower potential than the line potential, being the voltage drop from A to L2 and, of course, its magnitude depends on the setting of contact A. The magnitude of the potential furnished by the transformer 26' is, as explained above, the function of the magnitude of the current flowing through the welding load and the vectorial direction of the same is opposed to the vectorial direction of the voltage furnished by the transformer 27. In operation, a decrease in welding current below the desired magnitude will enable the component from transformer 27 to assume greater preponderance thereby increasing the instantaneous biasing voltages applied to the tubes of conductances 21 and 22 thus advancing the phase of the output of the phase shifting circuit and increasing the effective welding current.

Conversely, an increase in welding current causes an increase in the voltage output of transformer 26' which bucks down the reference potential supplied by transformer 27 thereby decreasing the instantaneous biasing potentials applied to the tubes of the bridge circuit thereby retarding the phase of the output of this circuit to reduce the effective welding current. Capacitances 31 (in series with the secondary of transformer 23) and 32 (shunting one of the conductances in the bridge circuit) are provided for the purpose of so centering the neutral or intermediate point of the total phase shifting arc with respect to the source of voltage wave so as to permit utilization of the entire extent of the phase shift permitted by the bridge circuit in the control of the welding current thus permitting a very wide range control.

Referring to Figure 1 there is provided a relay 33 arranged to be energized from the line L1—L2 through a transformer 34, a timer 35, and a switch 36 which may be either manually or automatically controlled. Upon closure of this switch, relay 33 will be energized and remain energized until the timer 35 has timed out its period. On relay 33 are two contactors 37 and 38 which connect the anodes of the valves 10 and 11 with the anodes of the associated discharge devices 12 and 13, respectively. Timer 35 may be provided with an additional output lead 39 which is energized one-half cycle later than the relay 33. Conductor 39, in turn, energizes a relay 40 having the normally closed contactor 30 mentioned above. At the start of the welding cycle, with contactor 30 closed, the resistance of potentiometer 29 provides a bucking voltage, a drop from B to L1, which prevents the voltage A to L2 from over-controlling and phasing the principal valves back to cut-off. In practice, slider B of the potentiometer 29 is adjusted to provide for the bucking voltage which is approximately equal to the bucking voltage which will be applied by transformer 26' during the actual flow of welding current. Thus, starting of the flow of welding current is permitted immediately upon energization of relay 33. At the expiration of the initial one-half cycle, however, relay 40 is energized to disconnect potentiometer 29 thus removing the bucking voltage supplied by this potentiometer and enabling the voltage produced by transformer 26' to assume control of the operation of the system in the manner outlined above. Upon expiration of the time for which timer 35 is adjusted relays 33 and 40 are de-energized and the flow of welding current ceases.

In the modification of Figure 2 alternating potential in phase with the welding current source is furnised the input of the phase shifting bridge circuit 18 by the conductors L3 and L4. The centering capacitance (41) is, in this embodiment, placed in the primary circuit of the grid transformer 16, this circuit being the output of the phase shifting network. In this modification the controlled alternating biasing potential applied to the control grids of the tubes of the grid circuit 18 through the transformer 25 is furnished from a source 42 (in phase with the welding current source) through the transformer 43. The supply circuit is a series circuit including the primary of transformer 25, the secondary of transformer 43, the anode-cathode circuit of vacuum discharge device 44 and the resistance 45 of a potentiometer 46. In a manner to be hereinafter explained the dynamic plate resistance characteristic of the tube 44 is utilized to modulate the strength of the alternating biasing voltage applied to the tubes of the bridge in accordance with variations in an operating condition as related to a predetermined adjustment of a normally fixed condition.

A normally fixed reference voltage is developed across a resistor 47 by a full-wave rectifier 48 deriving energy from the line through transformer 49. A potentiometer 50 adjusts the voltage applied to the rectifier and consequently determines the potential developed across resistor 47. A second direct current potential, variable in accordance with an operating condition (strength of welding current in this embodiment) is developed across a resistor 51 by a full-wave rectifier 52 having its input terminals connected to the secondary of a current transformer 53 the primary of which is in the welding load circuit. Potentials across resistors 47 and 51 are in opposition to each other and these resistors are connected in series in the grid biasing circuit of a controlled discharge device 54, the circuit being traceable from the cathode of such device, conductor 55, resistor 47, conductor 56, resistor 51, conductor 57, grid resistor 58, and the control grid or grids of the tube 54. Plate potential for the tube 54 is furnished by a rectifier 59 which derives its energy from the line through transformer 60 and impresses its output across the resistance element of the potentiometer 46. It will be observed that the positive output terminal of the rectifier 59 is connected to the anode or anodes of the tube 54 through conductor 61 while the cathode of this tube is connected to the negative terminal thereof through conductor 55 and resistance 62. Tube 54 is thus set up to draw current in accordance with the degree of balance maintained between the opposing potentials across resistances 47 and 51. The first potential is, as explained above, normally fixed and therefore upon the welding current decreasing by reason of an increase in load impedance, for example, the voltage at 51 decreases thereby shifting the bias of tube 54 in a negative direction to decrease its output. Variations in the output of tube 54 are utilized to shift the normally fixed bias of tube 44 and for this purpose the control grid of tube 44 is connected to the cathode circuit of tube 54 through a current limiting resistor 63. The biasing circuit for tube 44 may therefore be traced from the cathode thereof through conductor 64, the lower part of potentiometer 46, resistance 62, conductor 55, and resistor 63. As conduction is increased in tube 54 higher voltages are developed across resistance 62 in a direction opposing the potential supplied by potentiometer 46 thereby bucking down the grid potential of the tube 44. In order that a control of the magnitude of the full wave furnished by transformer 43 may be effected, as is required for the operation of the symmetrical bridge circuit, a direct current component is applied to the plate circuit of the tube 44 by the potentiometer 46. The dynamic plate resistance of the tube 44 varies in accordance with changes in its grid potential and consequently the alternating voltage applied to the transformer 25 varies in magnitude according to potential changes across resistor 51.

Thus, as potential across resistor 51 decreases, as may be caused by a drop in welding current for example, tubes 54 and 44 draw less current whereby less negative alternating voltage is applied to the control electrodes of the tubes of the phase shifting circuit. The extent of phase shift is accordingly lessened, the valves 10 and 11 begin to conduct earlier in the succeeding half cycles of the source and more energy is furnished the load circuit to maintain the desired current value. In this manner automatic compensation or regulation of the current flowing in a load circuit may be maintained. It will be readily apparent that the desired value of such current may be readily varied (adjusted) by moving the slider of the potentiometer 50. It is within the purview of this invention that the control circuits disclosed herein may be employed wherever applicable. For example, by substituting a voltage transformer for the current transformer in either of the systems specifically disclosed voltage regulation may be effected in a load circuit. Likewise, if it is desired to vary any of the conditions controlled according to time or other change in reference condition the same may be readily effected by altering the reference voltage (transformer 27 in Figure 1, resistor 47 in Figure 2) accordingly. For example, means may be provided to automatically change the settings of the potentiometers 28 and 50 during any cycle of operation.

The phase shifting network of the invention as applied to the control of a valve or valves in a supply circuit is also exceptionally well suited for the purpose of manually controlling the strength of current furnished a welding load. In this adaptation or use of the principles of the invention the manual control, commonly termed "heat" control, may be effected with finesse of adjustment simply by varying the strength of direct current potential injected in the principal biasing or control circuit of the bridge network. Another advantage of this system is that a maximum range of conrol within the capacity of the welding machine may be effected in the manner outlined and this range is much wider than that which can be attained by any comparable system now in use or proposed for the same purpose.

It should now be apparent that we have provided improved methods and systems which accomplish the objects initially set out. The improvements in the phase shifting circuit enable a wide range of operation or adjustment to be effected automatically in response to variations in a simple reference condition. The capacity of a circuit of this nature to be employed for the control of circuit controlling valves interposed in a load circuit presents many substantial advantages.

While the phase shifting bridge circuits illustrated in the drawing and described above are of the symmetrical double-reactance type, it should be understood that an operative system having a lesser range of control can be provided by employing normally fixed conductances in one leg of the input circuit and a variable conductance and reactance in the other leg. The term "conductance" is used herein to denote a condition or value which is the reciprocal of resistance or an instrumentality which is operative to produce such condition or value. Thus in the single-reactance type of circuit the fixed leg may comprise a pair of normally fixed resistances. The generic term "translating device" is used herein and in the appended claims to denote any of the circuit elements of the bridge—whether resistance, reactance or conductance.

The above specifically described embodiments of the invention should accordingly be considered as illustrative only as obviously many changes may be made therein without departing from the spirit or scope of the invention. Certain of such changes are suggested above while others will readily become apparent to those skilled in the art. For example, results of extensive experiments indicate that more uniform operation while requiring less critical adjustments may be expected from the system of Figure 2 by replacing the rectifier 52 and associated resistors with one or two electronic rectifiers whose emission or conduction is dependent on filament temperature. In this embodiment the filament or filaments of the rectifiers are, of course, connected to the secondary of the current transformer 53 through suitable voltage dividing or reducing resistances so that the changes in the emission of the rectifier or rectifiers as results from changes in the temperature of the cathode or cathodes may be utilized to vary the biasing potential furnished the control circuit of the phase shifting bridge network. Reference should therefore be had to the appended claims in determining the scope of the invention.

What we claim is:

1. In an electric resistance welding system having a welding load circuit and means to control the flow of electrical energy thereto comprising a pair of reversely connected valves, the combination of a symmetrical bridge phase shifting network in control of conduction in said valves and having a reactance device and a variable conductance in series in each of the two legs of the input circuit portions of the bridge, each of said conductances comprising a pair of reversely connected grid controlled space discharge devices, a common control circuit for each of said discharge devices comprising a transformer having a single primary winding and a plurality of appropriately phased secondary windings each connected to the control grid of one of said discharge devices, and means to energize said primary winding in accordance with the strength of current flowing in said load circuit.

2. Apparatus according to claim 1 further including an alternating current source and further characterized in that said energizing means comprises a current transformer having as its primary one of the conductors in said load circuit, a biasing transformer having its secondary winding connected in series with the primary winding of said first mentioned transformer and with the secondary winding of said current transformer, and a second phase shifting circuit interconnecting said source with the primary winding of said biasing transformer and being operative to selectively apply to said biasing transformer voltages substantially in phase or far out of phase with the voltages of said source whereby said discharge devices may be blocked independently of said current transformer.

3. Apparatus according to claim 1 further including means to apply a biasing potential to said primary winding to hold said discharge devices non-conducting, a timer and means to initiate operation thereof, means operative simultaneously with said means to initiate to remove said biasing potential, and means operative upon said timer timing out its period to reapply said biasing potential.

4. Apparatus according to claim 1 further characterized in that said last mentioned means comprises an alternating current source and a transformer having its primary winding connected with said source and its secondary winding connected in a series circuit with said first mentioned primary winding, a variable conductance in said series circuit, means establishing a static reference potential, means establishing a potential proportionate to said strength of current and in opposition to said static reference potential, and means to control said last mentioned conductance in accordance with the degree of unbalance between said two last mentioned potentials.

ROBERT L. RINGER, Jr.
CLYDE E. SMITH.

REFERENCES CITED

The following references are of record in the file of this patent:

UNITED STATES PATENTS

| Number | Name | Date |
| --- | --- | --- |
| 1,901,659 | Bedford | Mar. 14, 1933 |
| 1,911,051 | Bedford | May 23, 1933 |
| 2,039,044 | Wolfert | Apr. 28, 1936 |
| 2,246,178 | Levoy | June 17, 1941 |
| 2,246,179 | Lord | June 17, 1941 |